No. 885,283. PATENTED APR. 21, 1908.
J. R. PEIRCE.
MACHINE FOR WORKING MARBLE OR THE LIKE.
APPLICATION FILED APR. 25, 1906.
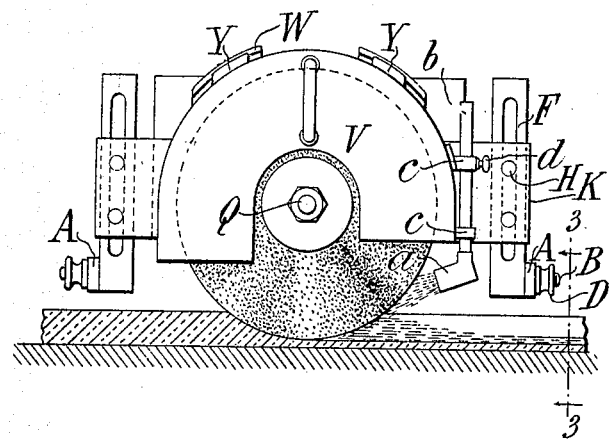
FIG. 1.
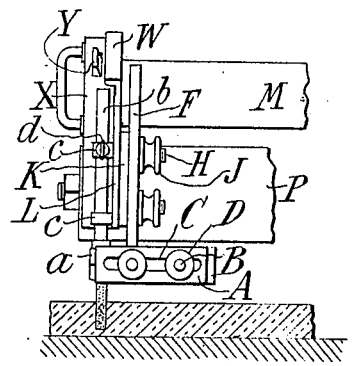
FIG. 2.
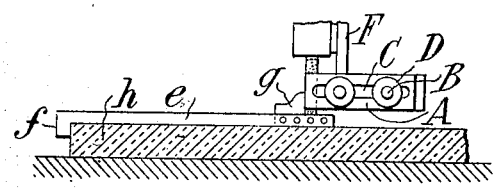
FIG. 3.
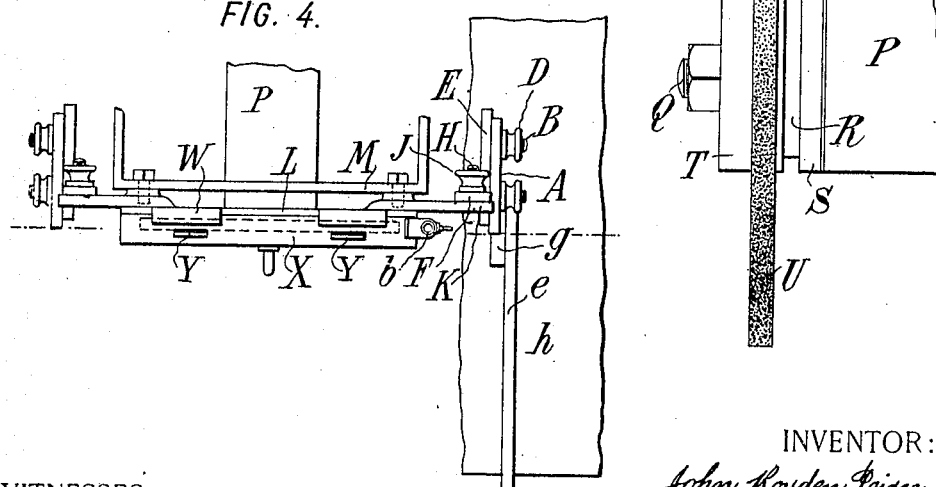
FIG. 4.
FIG. 5.
WITNESSES:
Fred White
René Buine
INVENTOR:
John Royden Peirce,
By Attorneys,
Arthur C. Fraser & Usina

UNITED STATES PATENT OFFICE.

JOHN ROYDEN PEIRCE, OF NEW YORK, N. Y., ASSIGNOR TO ROYDEN MARBLE MACHINERY COMPANY, OF NEW YORK, N. Y., A CORPORATION OF NEW JERSEY.

MACHINE FOR WORKING MARBLE OR THE LIKE.

No. 885,283.  Specification of Letters Patent.  Patented April 21, 1908.

Application filed April 25, 1906. Serial No. 313,584.

*To all whom it may concern:*

Be it known that I, JOHN ROYDEN PEIRCE, a citizen of the United States, residing in the borough of Manhattan, city, county, and State of New York, have invented certain new and useful Improvements in Machines for Working Marble or the Like, of which the following is a specification.

In numerous prior applications I have described apparatus for coping, molding, countersinking, rubbing and otherwise working marble and similar stones by means of carborundum or a similar material. Carborundum wheels revolve at a very high velocity, and it is generally necessary to supply large quantities of water. Consequently the wheel is generally enveloped in a thick mist or spray, especially at the point where the cutting is taking place, so that it is difficult for the workmen to locate the stone so that the wheel will cut it along a desired line on the stone. Furthermore it is dangerous for the workmen to approach their heads or hands very close to the wheels or in line therewith, because of the liability of the wheels to be broken and to fly apart with great force.

The present invention provides also a convenient style of hood for the wheel which limits the amount of spray, and also the danger from accidental rupture of the wheels; and, in combination with this hood, a gage by means of which the workman can locate the slab properly in order to cut along a desired line. Preferably the gage and the hood are designed to be attachable to and detachable from a variety of machines, and preferably the gage, hood, and nozzle through which the water is supplied, are carried in a unitary construction, so that they may all be attached to or detached at once from the machine.

The accompanying drawings illustrate an embodiment of the invention.

Figure 1 is a side elevation of the hood, gage, and nozzle applied upon a coping machine; Fig. 2 is an edge elevation of the same; Fig. 3 is an elevation approximately on the line 3—3 of Fig. 1, showing the method of using the gage; Fig. 4 is a plan also showing the gage in use; Fig. 5 is a central vertical section through the hood.

Referring to the embodiment of the invention illustrated, there are preferably two gages, one on each side of the wheel, so as to be in advance thereof in feeding a slab to the wheel from either side. Of course where the feed is always in one direction, only one of the gages need be used. Each gage preferably stands normally above the marble and clear of the table, so as to avoid interference not only with the marble but with any projecting clamps.

The effective point of the gage is the end of a stop A, which is adjustable vertically for different thicknesses of marble, and horizontally for different thicknesses of the wheel, or for such slight differences in the position of the wheel as may occur in different machines. For example the stop A may be a bar which is supported by a pair of pins B fastened through the slot C of the bar so as to maintain its horizontality, while permitting adjustment, knurled nuts D being screwed on the pins B to clamp the stop A in position. The pins B are carried upon a horizontal arm E formed on or attached to the lower end of a vertical slide F, provided with a slot G through which a pair of guiding pins H pass, these pins being screwthreaded and provided with knurled nuts J for clamping the slide F at any desired elevation. The pins H are attached to an arm K projecting laterally a considerable distance beyond the edge of the wheel, and preferably forming an extension of the back L of the hood.

The back L of the hood with the extensions K for carrying the gage stops, may be fastened in any suitable way to the frame of the machine, depending upon the construction of the particular machine in question. For example the frame may be as shown at M, and the back of the hood and the extensions K may be provided with lugs N adapted to receive the bolt O passing through the frame of the machine. The bearing P for the wheel shaft Q is preferably a roller or ball bearing of the best type for high speed. In order to protect the bearing from the water and mud thrown off by the wheel and dripping constantly from the hood, the back L of the hood preferably projects downward into a groove R in the inner one of the two washers S and T between which the wheel U is clamped on the shaft.

The front V of the hood covers the outer side face of the wheel, and is divided from the back along a plane parallel to the wheel, being attached to the back at points beyond the edge of the wheel so as to be attachable to and detachable from the back L by mere lowering and lifting movements, swinging the front up and then pulling it in the manner indicated in dotted lines in Fig. 5. This permits the quick removal of the front of the hood, and quick access to the wheel without the necessity of tools. The means for holding the parts together may consist for example of lips W on the edge of the back L of the hood overhanging the rim X of the front, while teeth Y project upward through suitably located holes in the rim X and prevent the withdrawal of the front until it is tilted up in the manner indicated. A handle Z is located upon the outer face of the front of the hood.

A nozzle $a$, which is preferably in the form of a rose arranged to project a large quantity of water upon the marble as well as upon the wheel, and preferably at the point of contact of the two, is carried upon the lower end of a pipe $b$, to which a hose or other conduit is connected, the pipe $b$ being adjustable in stirrups $c$ arranged upon the rim X of the front V of the hood, and may be clamped in position by means of a thumb-screw $d$ in one of these stirrups.

In connection with the gages I preferably use a measuring tool $e$ (Figs. 3 and 4). This tool has a downwardly bent end $f$ adapted to engage a finished edge of the marble $h$, and an upwardly projecting stop $g$ which is adjustable along the measuring tool to correspond with any desired width of slab.

In starting a cut with a new wheel, the slide F having been raised or lowered a sufficient distance to permit the passage of the marble and clamps, a straight edge is laid along the face of the wheel, and the stops A brought up against this straight edge, so that they will be in line with the outer edge of the wheel as shown most clearly in Fig. 4. Thereupon the slide $h$ of marble is laid on the bed with its forward edge under the stop A, and the tool $e$ is laid thereon, and the slab is shifted until the upward projection $g$ engages the stop A, after which the tool E is removed and the cutting proceeded with.

The divisibility of the hood not only permits ready access for the changing of wheels, but by permitting the use of fronts having rims of different widths adapts the machine for wheels of various thicknesses.

The gage alone, constituting a separate invention, is not claimed herein but in a separate application No. 342,815, filed November 10, 1906.

Though I have described with great particularity of detail a certain specific embodiment of my invention, yet it is not to be understood therefrom that the invention is limited to the specific embodiment disclosed. Various modifications thereof in detail, and in the arrangement and combination of the parts, may be made by those skilled in the art, without departure from the invention.

What I claim is:—

1. An attachment for marble working machines having a rotating wheel of agglomerated material, said attachment comprising a member L carrying a gage at a point in line with and in advance of the wheel, and a member V constituting the front portion of a hood and attachable to said member L.

2. A hood for marble working machines having a rotating wheel of agglomerated material, said hood comprising a back L adapted for attachment to the frame of a machine and having an overhanging lip W and teeth Y, and a member V constituting the front of the hood and having a rim X adapted to be engaged under and held by said lip W, and apertured to engage said teeth Y so that the front may not be withdrawn except by tilting it upward and disengaging it from the teeth Y.

3. An attachment for marble working machines having a rotating wheel of agglomerated material, said attachment comprising a gage and a hood forming a single unitary apparatus adapted for attachment to and detachment from the machine, with the hood in position over the wheel, and the gage in line with and in advance of the wheel.

In witness whereof, I have hereunto signed my name in the presence of two subscribing witnesses.

JOHN ROYDEN PEIRCE.

Witnesses:
D. ANTHONY USINA,
THEODORE T. SNELL.